F. R. BATCHELDER.
ASSEMBLING MACHINE.
APPLICATION FILED FEB. 6, 1918.
1,302,280.
Patented Apr. 29, 1919.
5 SHEETS—SHEET 1.
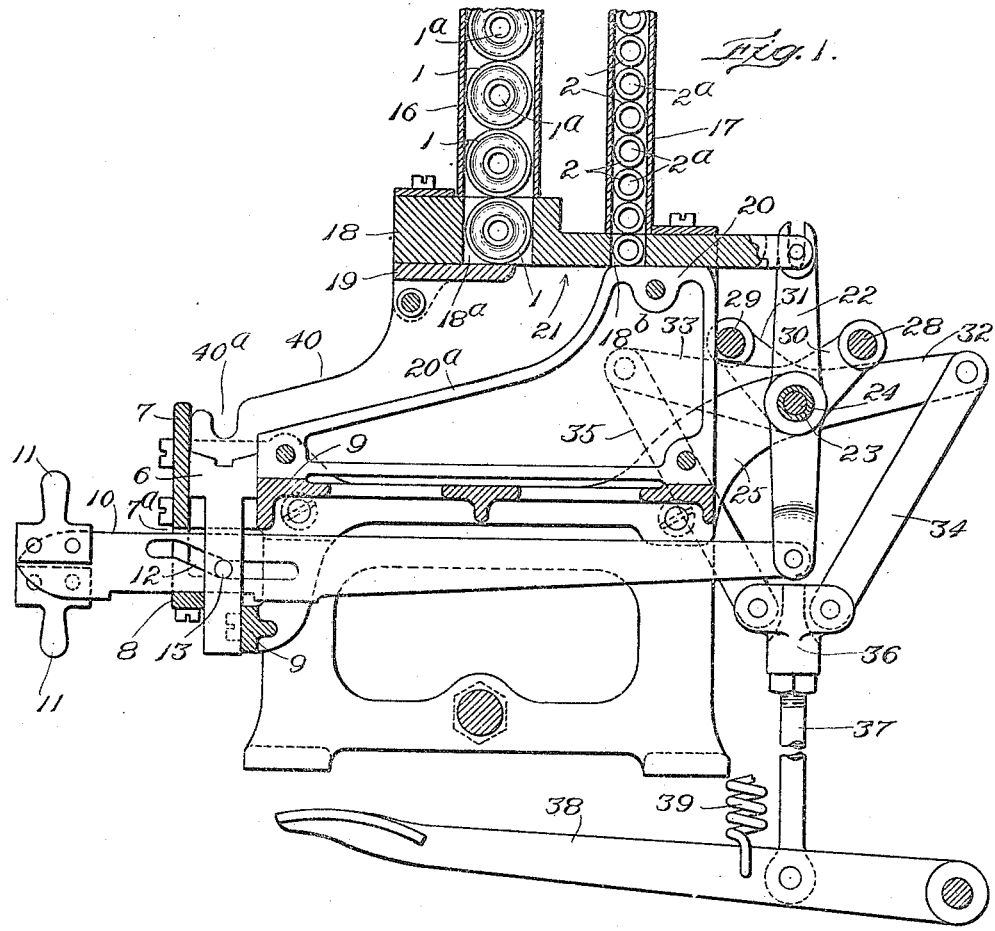
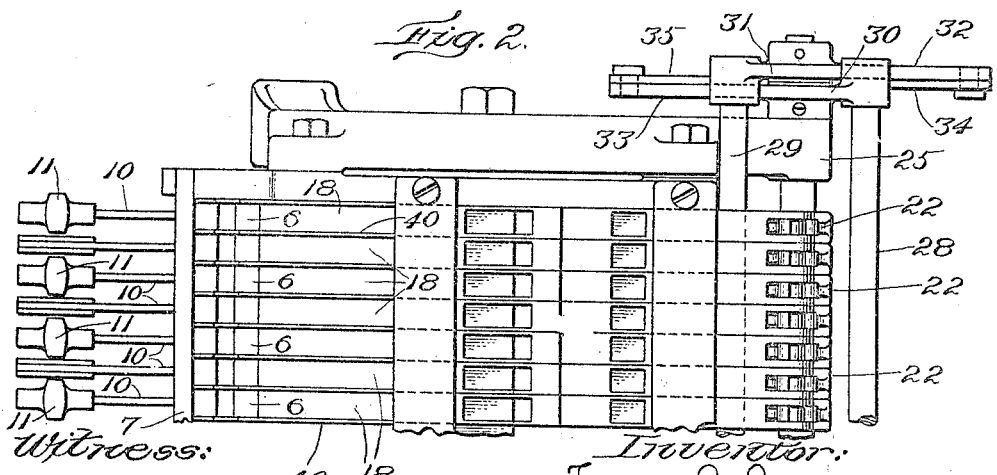
Witness:
Oscar F. Hill
Inventor:
Frank R. Batchelder
by Chas. F. Randall
atty.

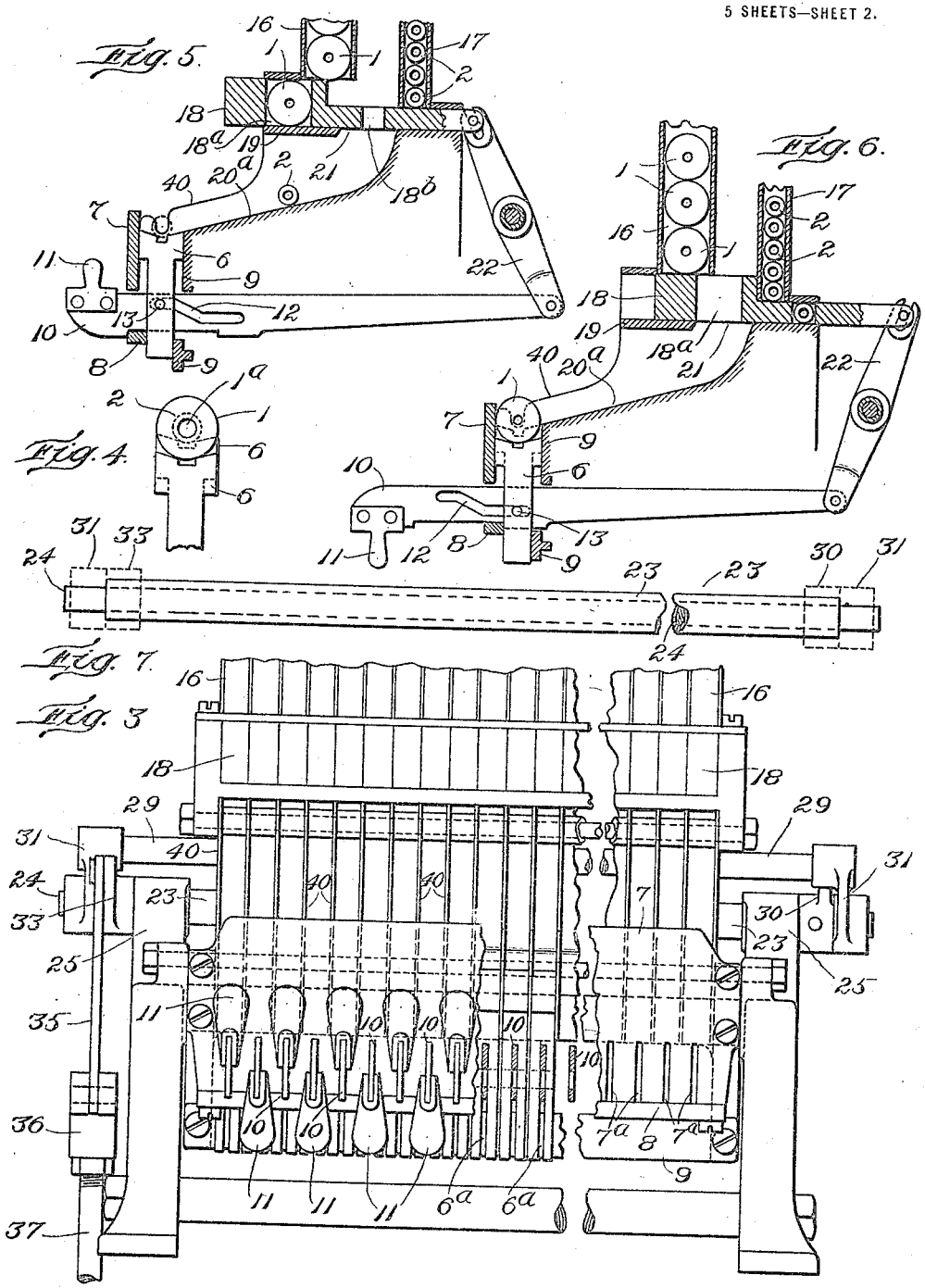

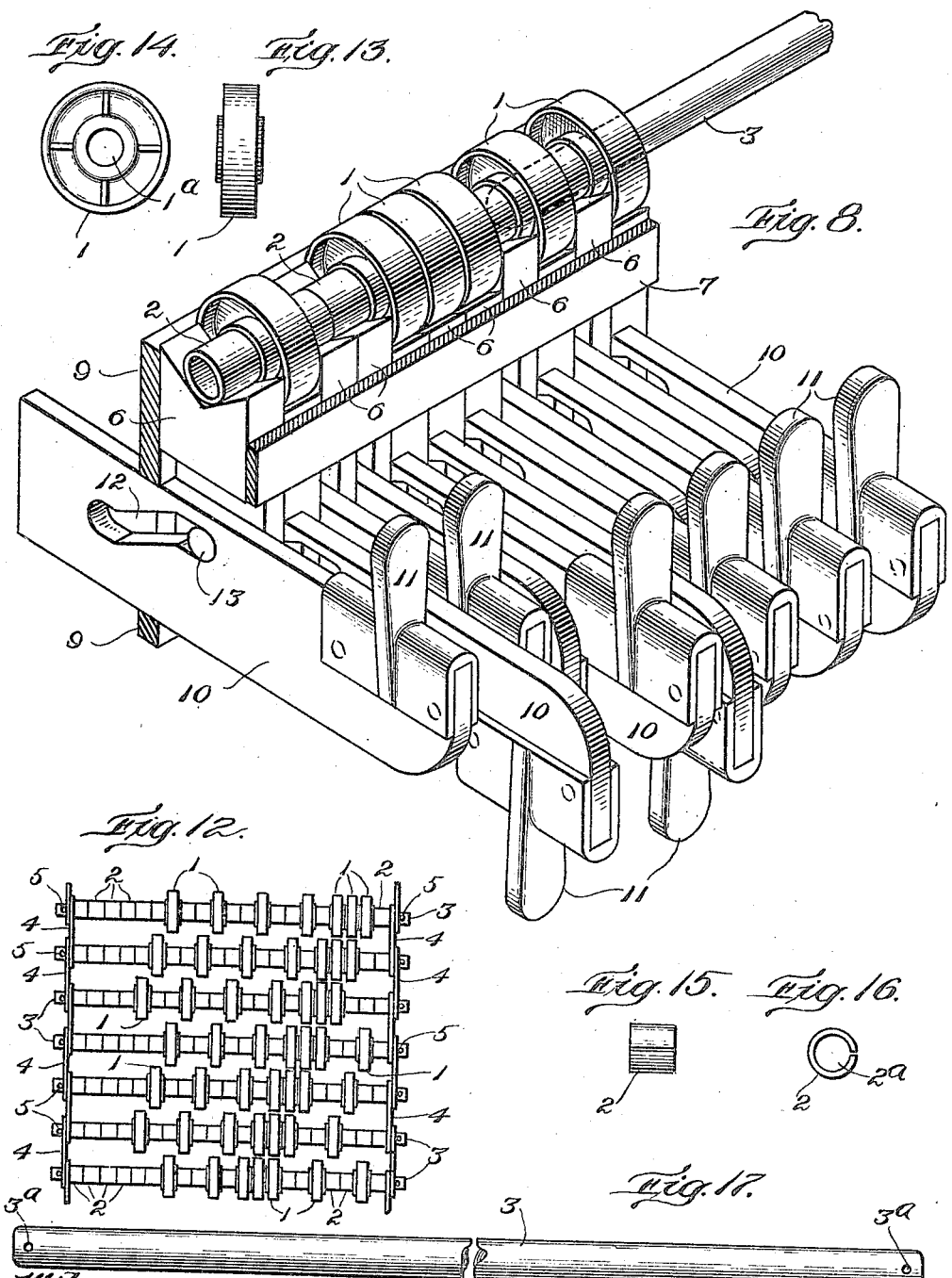

F. R. BATCHELDER.
ASSEMBLING MACHINE.
APPLICATION FILED FEB. 6, 1918.
1,302,280.
Patented Apr. 29, 1919.
5 SHEETS—SHEET 4.
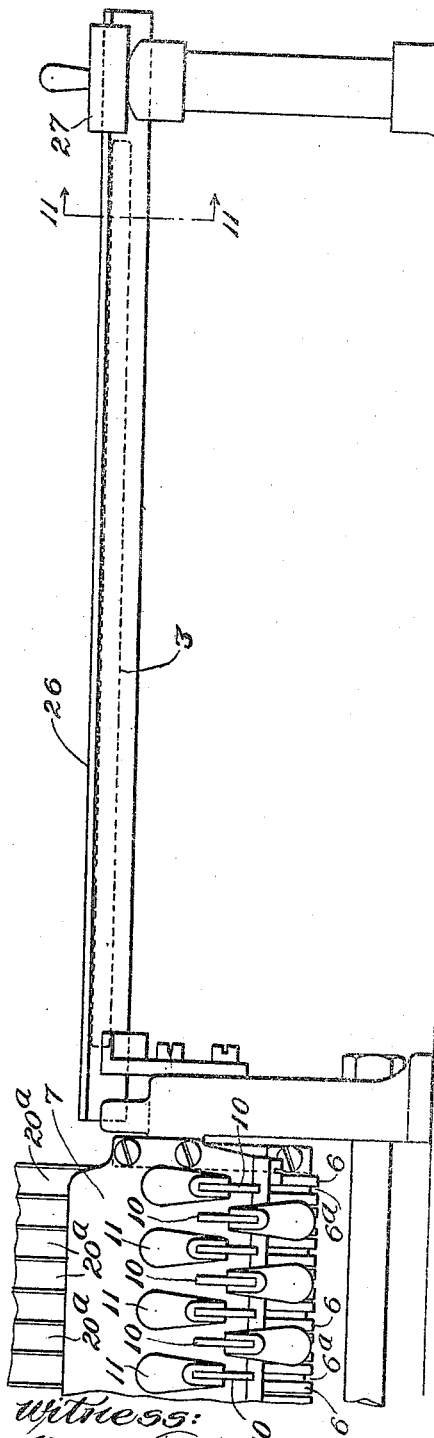
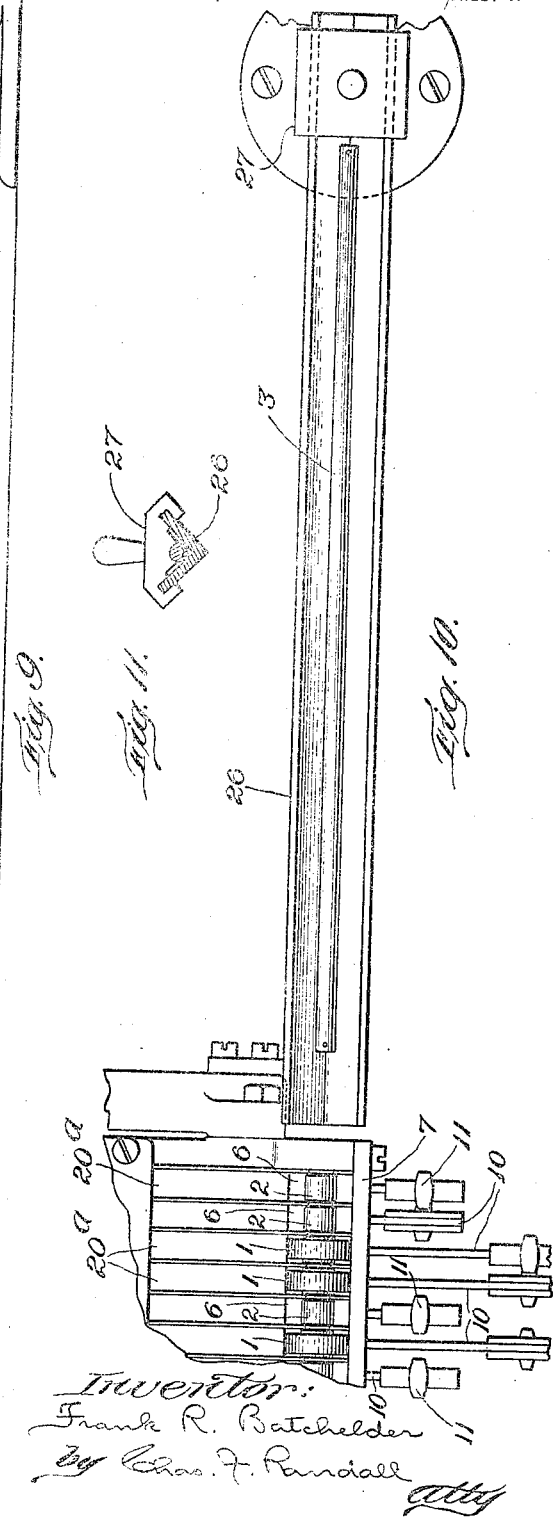
Fig. 9.   Fig. 11.   Fig. 10.
Witness:
Oscar F. Hill
Inventor:
Frank R. Batchelder
By Chas. F. Randall
Atty F. R. BATCHELDER.
ASSEMBLING MACHINE.
APPLICATION FILED FEB. 6, 1918.
1,302,280.
Patented Apr. 29, 1919.
5 SHEETS—SHEET 5.
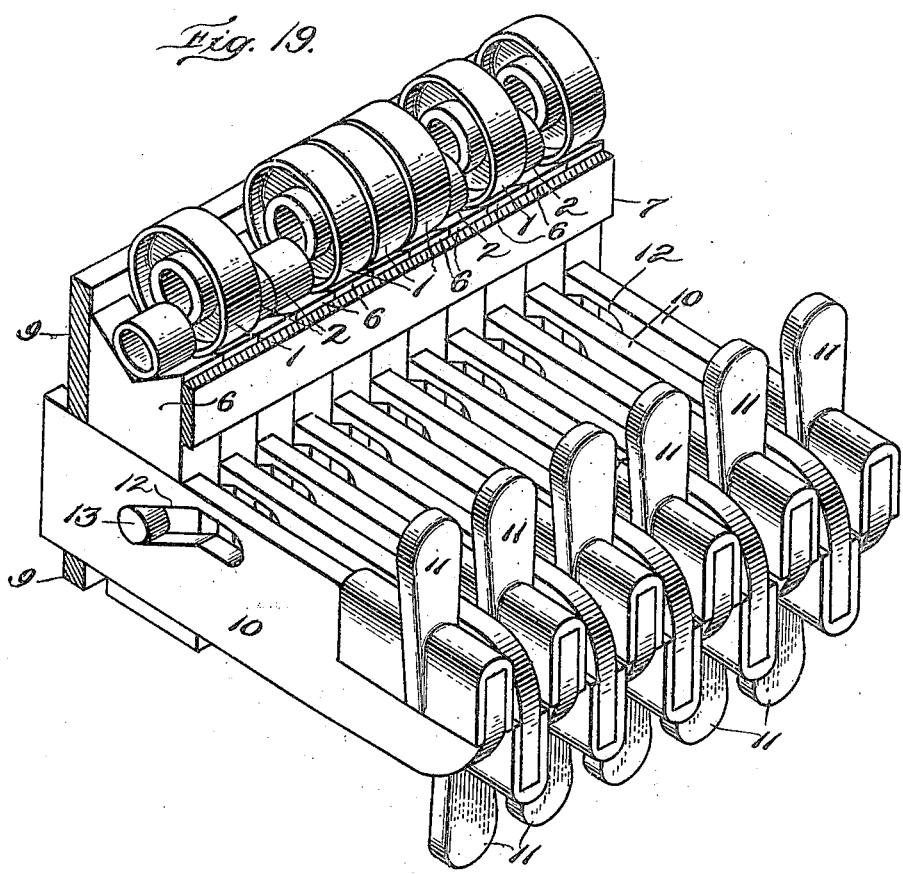
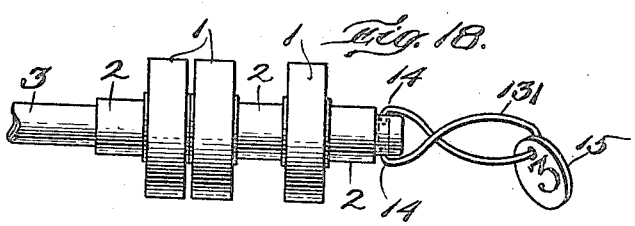
Witness:
Oscar F. Hill
Inventor:
Frank R. Batchelder
by Chas. F. Randall
Atty

UNITED STATES PATENT OFFICE.

FRANK R. BATCHELDER, OF WORCESTER, MASSACHUSETTS.

ASSEMBLING-MACHINE.

1,302,280.  Specification of Letters Patent.  Patented Apr. 29, 1919.

Application filed February 6, 1918. Serial No. 215,696.

*To all whom it may concern:*

Be it known that I, FRANK R. BATCHELDER, a citizen of the United States, residing at Worcester, in the county of Worcester, State of Massachusetts, have invented a certain new and useful Improvement in Assembling-Machines, of which the following is a specification, reference being had therein to the accompanying drawings.

The invention has for its object to provide devices or mechanism for use in "building", as it is called, *i. e.* assembling, pattern or control-chains such as are employed in looms and various other machines for controlling the operations thereof. Also, for use in performing other similar assembling work. So far as I am aware, no machines have heretofore been known or used for doing in the case of pattern or control-chains of the class contemplated by the invention the work which is done by the devices or mechanism that are comprised in the invention.

The particular class of pattern or control-chains contemplated is that in which the chain-elements or indicators making up the respective transverse rows of a chain are formed with openings by means of which they are mounted upon the transverse bars or rods of the chain. This class embraces several different specific varieties, the most familiar variety being that in which the chain-elements or indicators consist of rolls and sleeves having eyes which fit the transverse bars or rods. The sleeves are smaller in diameter than the rolls, and usually are termed "spacers". The features of the invention are especially applicable to the assembling of chain-elements of this variety, but are not necessarily restricted thereto.

Devices or mechanisms embodying the invention comprise means by which the respective elements, of different kinds or sizes, required for a row or series are adjusted relative to one another so as to aline the openings of the row or series in readiness for reception of the supporting-bar or rod. In its more complete embodiment the invention includes devices for the selective feeding of elements of different kinds or sizes to make up a row or series, and means for combining a supporting-bar or rod with the row or series. Certain of the features of the invention may be used without the said selective feeding devices and bar-combining means, however. The invention includes various features and combinations, all as hereinafter defined in the claims at the close of this specification.

The drawings show illustrative embodiments of the features of the invention.

In the drawings,—

Figure 1 is a view in section, in a vertical plane extending from front to rear, of an assembling machine comprising the said embodiments.

Fig. 2 is a plan view of the parts at one end of the machine, with the containers for rolls and spacers removed.

Fig. 3, Sheet 2, is a view of portions of the machine, partly in front elevation and partly broken away in different places to show construction, the means for combining a supporting-bar or rod with the row or series of rolls and spacers being omitted for want of room.

Fig. 4 is a detail view showing two element-positioning supports or receiver-sections supporting, respectively, a roll and a spacer, with the said sections relatively adjusted so as to place the roll and spacer in mounting alinement, *i. e.*, with the roll-eye and spacer-eye alined with each other in readiness for insertion of a supporting-bar or rod.

Fig. 5 is a partial cross-sectional view of the machine, upon a smaller scale than Figs. 1, 2 and 3, illustrating its action when operated to deliver a spacer.

Fig. 6 is a view like Fig. 5, but illustrating the action of the machine when operated to deliver a roll.

Fig. 7 is a view of the rockshaft and sleeve of the evener devices.

Fig. 8, Sheet 4, is an isometric of a portion of the sectional receiver and its keys, with a supporting-bar partially inserted into an assembled and alined row or series of rolls and spacers.

Fig. 9, Sheet 3, shows in front elevation means for inserting a supporting-bar into a row or series of rolls and spacers.

Fig. 10 is a plan view thereof.

Fig. 11 is a cross-section on line 11—11 of Fig. 9.

Fig. 12, Sheet 3, is a view showing a portion of a pattern or control-chain such as the illustrated machine is adapted for building or assembling.

Figs. 13 and 14, respectively, are an elevation and side view of a roll of the pattern or control-chain of Fig. 12.

Figs. 15 and 16, respectively, are an elevation and side view of a spacer of said chain.

Fig. 17 is a view of one of the transverse supporting-bars or rods of the said chain.

Fig. 18, Sheet 5, is a view showing one end of a supporting-bar with chain-elements or indicators thereon, and with a retainer engaged with the bar to prevent escape of said elements or indicators from the bar.

Fig. 19 is a view on the order of Fig. 8, showing an alternative method of utilizing the sectional receiver or aliner.

Referring briefly to the pattern or control-chain construction shown by Figs. 12 to 17, Sheet 3, the transverse rows or lines of the said chain are composed of rolls 1, 1, and spacer-sleeves 2, 2, (or spacers as the latter parts may be called) of smaller diameter than the rolls, carried by supporting-bars 3, 3, The said supporting-bars are joined together by links 4, 4, into a continuous series, which latter in usual practice is in endless form. The rolls 1, 1, and spacer-sleeves or spacers 2, 2, have central openings or eyes $1^a$, $2^a$, which fit the supporting-bars, and they are strung upon each of the respective supporting-bars in an order or sequence determined by the corresponding transverse line of the general pattern which is embodied in the pattern-chain. The links, 4, 4, have eyes in their ends, which fit the ends of the supporting-bars, and the links are held in place upon the ends of the supporting-bars by means of cotter-pins 5, 5, occupying holes $3^a$, $3^a$, in the outwardly-projecting portions of the supporting-bars.

The main feature of the invention is an aliner comprising a series of element-positioners 6, 6, etc. This feature may be employed alone, as an assembler, or may be employed conjointly with the adjunctive features to which reference is made below, as in the illustrated machine. The said element-positioners may vary more or less in construction, arrangement, and specific mode of operation. Their essential principle is that of being respectively adjustable into positions in which the openings or eyes of elements of different sizes that have been placed side by side in a row or series are alined with one another so that a supporting-bar or rod 3 may be combined with the series by placing it in the said alined openings. In the illustrated machine the element-positioners 6, 6, etc., are vertically movable slides which are mounted side by side at the front of the machine between a front rail 7 and rear rails 9, 9. The tops of the said slides are concaved to form pockets to contain chain-elements, preferably being V-shaped, as shown. When the slides are at one level, their alined tops form a kind of trough, the front wall of which is constituted by the upper portion of rail 7, which rises above the tops of the slides. This trough constitutes a receiver for the chain-elements which as a series are to be mounted upon a supporting-bar. The slides constitute receiver-sections which are individually adjustable vertically into a higher level and a lower level, respectively. Suitable adjustments thereof are effected by the workman for the respective rows or lines of chain-elements or indicators of a pattern or control-chain.

If, now, as in Figs. 4 and 8, certain of the element-positioners 6, 6, of the series occupy their higher position and support spacer-sleeves or spacers 2, and the remaining element-positioners occupy their lower position and support rolls 1, the eyes of the chain-elements of the two different sizes will be found to be alined with one another, and a supporting-bar or rod 3 may be combined with the series of chain-elements by passing it lengthwise into the series of alined eyes, as indicated in Fig. 8.

The element-positioners, usually in practice, have keys conveniently combined therewith for use in manually setting the respective element-positioners of the series in the positions required for placing a row or series of chain-elements in mounting alinement. The illustrated machine is provided with a series of horizontally-sliding keys 10, 10, occupying vertical slots $6^a$, $6^a$, etc., Figs. 3 and 9, in the lower portions or shanks of the element-positioners. These keys occupy vertical slits $7^a$, $7^a$, Fig. 3, in front rail 7, and are furnished at their front ends with finger-holds 11, 11, for convenience in moving them endwise by hand as required for setting the element-positioners. These keys have cam-slots 12, 12 which are occupied by projections or pins 13, 13, carried by the said lower portions or shanks of the element-positioners. The said cam-slots have each an inclined acting middle portion, by means of which the corresponding element-positioner is moved up or down according as the key is pushed rearward or pulled forward, and dwell-portions at opposite ends of said inclined middle-portion. Said dwell-portions keep the element-positioners securely at rest in their elevated or depressed positions of adjustment, as the case may be.

When the element-positioners are employed without automatic element-feeding devices, as in some cases, the elements to be assembled in mounting-alinement are fed by hand to the element-positions.

In these cases, according to one plan of performing the operations, the element-positioners or supports of the series may be adjusted into their lower positions with their notched upper ends in one horizontal line. Rolls and spacers may then be laid in the receiver or trough, side by side, as in Fig. 19, in the order indicated by the corresponding lines of the pattern-chart which guides in making-up or building the pattern or control-chain. The element-positioners or supports upon which spacers have been laid will then be raised so as to aline the eyes of the spacers with those of the rolls, as in Fig. 8. During these stages the row or line is subject to inspection, and any mistakes in selection or arrangement may be corrected. The openings or eyes of the series having been alined with one another, so that they all register with one another, the supporting-bar 3 is inserted into such openings or eyes from one end of the row or line, as in Fig. 8.

Or, starting with all of the element-positioners or supports in their lowest position as in Fig. 19, those which are to receive spacers may first be raised to their highest position, and then spacers may be applied to those which have been raised and rolls to those which remain down, according to the pattern. The result will be a disposition of parts corresponding with that shown in Fig. 8. The eyes of the spacers and rolls will be properly alined for the application of a supporting-bar, permitting such application to be made.

Or, operations may be begun with all of the element-positioners or supports in their highest position, and after the application of rolls and spacers those which receive rolls may be depressed so as to place the eyes of the rolls in line with those of the spacers, giving the same disposition as that shown in Fig. 8.

Or, operations may be begun with all of the element-positioners or supports in their highest position, and before the application of rolls or spacers thereto, the element-positioners or supports to which rolls are to be applied may be pushed down. Rolls may then be dropped into the recesses, thereby produced, and spacers placed upon the remaining element-positioners or supports, again giving the disposition of parts that is shown in Fig. 8. The eyes of the spacers and rolls will be properly alined for the application of a supporting-bar.

After the supporting-bar has been combined with the row or series of pattern or control-elements or indicators, it is lifted away from the element-positioners or supports with the said series upon it, and placed upon a rack to await the linking together of the successive bars of the pattern or control-chain.

In order to prevent pattern or control-elements from being lost from the supporting-bars after the assembling has been performed, retainers may be engaged with the ends of said bars as shown in the case of one end of a bar in Fig. 18. A convenient form of retainer is shown at 131 in Fig. 18. It consists of a length of spring wire which is doubled back upon itself in the shape of a loop, with the free ends of the wire crossing each other and bent to form engaging portions 14, 14, facing each other. The said engaging portions are adapted to enter a hole 3ª at one end of a bar, from opposite sides of the latter, so as to connect the retainer with such end of the bar and enable it to keep the said elements or indicators from coming off from the bar. By squeezing the sides of the loop toward each other the bent ends may be separated, as for the purpose of facilitating engagement of such ends in a hole of a bar, or for the purpose of disengaging the retainer from such hole. Or one end of the wire may be bent to form an engaging portion and the other be left straight, in which case the latter end will not enter the hole of the bar, but will rest against the exterior thereof at the side opposite that at which the bent end enters the hole, thereby operating to keep the bent end engaged in the hole. The retainer may have connected therewith a tag as 15, numbered to indicate the place of the row or line of pattern-elements or indicators in the series of rows or lines comprised in the pattern or control-chain that is being built.

Preferably, in practice, the assembling receiver will have combined therewith devices for selectively feeding rolls and spacers thereto to make up the respective rows or series that are to be assembled. These devices may be provided with means for operating the same independent of that for operating the vertically moving sections of the assembling receiver, but preferably are combined with the keys of the said sections so as to be operated coördinately therewith. The drawings show one arrangement of selective feeding devices, with the latter operatively combined with the said keys.

In the illustrated arrangement of selective feeding devices the rolls and spacers are taken from containers 16, 17, in which they are stacked, the said containers being arranged vertically in this instance so that the contents of the containers are fed by gravity toward their delivery-ends. The said containers are arranged side by side in two lines or series, those for the rolls in one line or series, and those for the spacers in a second line or series parallel with the first. Below the said delivery-ends are arranged feeders 18, 18, in this instance in the form of slides, by means of which the rolls and spacers are delivered as required to the assembling receiver. The feeder-slides are arranged in a series, side by side, below the lower ends of the containers. The illustrated form of feeder has two pockets, namely a large one, 18ª, adapted to be occupied by a roll, and a small one, 18ᵇ, adapted to be occupied by a spacer. These pockets are in the form of openings made vertically through a feeder-slide, from the top to the bottom of the latter. When a feeder-slide is at the middle of its stroke as in Fig. 1, which is its normal position, the pockets are presented in position beneath the delivery-ends of the containers and are supplied with a roll and a spacer therefrom. In this intermediate position of a feeder-slide the roll occupying the roll-pocket thereof is supported by a plate 19 upon which the corresponding portion of the feeder-slide rests, and the spacer occupying the spacer-pocket is supported by the elevated portion of a runway-frame 20. Between the said plate and the said elevated portion of the runway-frame is an opening 21 leading to a space above the runway-portion $20^a$ of the said runway-frame. The runway extends to a point slightly above and adjacent one of the element-positioners or supports 6. For every element-positioner or support there is a runway, a feeder, and a pair of containers for rolls and spacers. As shown by Fig. 6, should a feeder be moved in the direction and to the extent necessary to place its roll-pocket $18^a$ over the opening 21 leading to the space above the corresponding runway, the roll occupying such pocket will be permitted to fall upon the said runway and will pass along the latter to the corresponding element-positioner or support. Or, as shown by Fig. 5, should the feeder be moved in the opposite direction to the extent necessary to place its spacer-pocket above the said opening, the spacer occupying such pocket will be permitted to fall upon the said runway, as shown by full lines, and will pass to the said element-positioner or support, as shown by a dotted circle. Thus, movement of a feeder in one direction from its normal position will operate to feed a roll, while movement in the other direction will operate to feed a spacer.

In order to enable an element-positioner and the corresponding feeder to be operated by one and the same key-movement, which is preferred, I combine them operatively in some cases. Herein, a key is connected by means of a lever 22 with a feeder, so that when the key is moved in the direction to adjust the corresponding element-positioner suitably to receive either a roll or a spacer the feeder is actuated to deliver the latter. The levers 22, 22, combining the keys with the feeders are arranged in a series at the back of the machine. The said levers are mounted loosely upon the exterior of a sleeve 23 surrounding a rockshaft 24 that is supported in bearings provided in connection with brackets 25 on the machine-frame. To permit of movement of a key and connected feeder in the proper direction to deliver a spacer, to the extent required to move the spacer-pocket from its normal position over the elevated portion of the corresponding runway as in Fig. 1 to a position over the space above the runway as in Fig. 5, the lower horizontal dwell-portion of the slot 12 in the key is made of considerable length, as shown.

While it is feasible to apply the supporting-bar or rod by hand to the openings or eyes of a row or series of rolls and spacers after they have been assembled and arranged in mounting alinement, and although I do so in practice in some cases, I also provide mechanical means for effecting such application when desired. The illustrated arrangement for the purpose comprises a V-shaped trough 26, Figs. 9, 10 and 11, located at one side of the machine and extending outward therefrom. This trough is adapted to receive a supporting-bar or rod 3 in horizontal position, and to support it in alinement with the alined eyes of the series of rolls and spacers occupying the receiver. Consequently, endwise movement of the supporting-bar or rod along the trough will introduce it into the said eyes. The supporting-bar or rod may be pushed along the trough by the workman's hand, or by means of a pusher, 27, which latter may be operated by the workman, in this case by hand.

Preferably, evening devices will be combined with the key and feeder devices for the purpose of restoring them and the element-positioners or supports to normal positions in readiness for assembling and mounting a fresh row or series of chain-elements. The drawings show a convenient arrangement for the purpose, such arrangement comprising evener-bars 28, 29, located at rear and front, respectively, of the series of combining-levers 22, with one evener-bar, 28, carried by arms 30 which are fixed upon the sleeve 23 at opposite ends of the latter, and with the other evener-bar, 29, carried by arms 31 which are fixed upon the rockshaft 24 at opposite ends of the latter. The arms 30, 31, project in opposite directions from the sleeve and rockshaft, respectively. Other oppositely-projecting arms 32, 33, in connection with the rockshaft and sleeve, respectively, are joined by connecting-links 34, 35, with a head 36, Fig. 1, at the upper end of a rod 37 having its lower end connected to a treadle 38. By movement of the treadle the two evener-bars are actuated simultaneously so as to move in opposite directions with respect to each other. A contracting spiral spring 39 in connection with the treadle acts with a tendency to raise the latter and through the described connections separate the evener-bars 28, 29, from each other and from the interposed levers 22, leaving the latter free to move, in participating in the key-movements and for the purpose of actuating the feeders. When the treadle is moved downward by pressure applied thereto, it acts to swing the evener-bars 28, 29, toward each other so as to operate upon the levers 22 to restore the latter to their intermediate position and thereby restore the feeders and keys to their normal positions.

Partitions 40, 40, separate the feeding-paths from one another so that the rolls and spacers shall not deviate from their proper courses in passing from the feeders to the assembler, and so that adjacent rolls and spacers shall not interfere with one another during their passage. These partitions are shown as extending across the assembler, being notched at 40ª, Fig. 1, to accommodate a supporting-bar and permit it to be raised vertically from the assembler with the load of rolls and spacers thereon, but this extension of the partitions may be omitted.

In some cases, in the employment of devices or mechanism embodying the features of the present invention, the chain-elements may first be assembled and combined with a transfer-bar, and from the latter be slipped by an endwise transferring movement upon a chain-bar.

I do not claim the method of assembling disclosed herein, considered apart from the devices or mechanism, inasmuch as the method is claimed in my application for United States Patent therefor filed Feb. 4, 1918, Serial No. 215,379.

The partitions 40 add somewhat to the length of the row or series of chain-elements or indicators as collected upon the assembler or aliner devices. In case such length exceeds that of the supporting-bar, the terminal spacers 2, 2, employed in Fig. 12 next adjoining the side links 4, 4, will not be included in the row or series as assembled in the machine but will be added to the supporting-bar by hand after the said bar with its load of rolls and spacers has been lifted from the assembler or aliner. When the partitions are omitted, as in the case of simpler embodiments of some of the features of the invention, the end spacers may be included in the row or series of rolls and spacers in assembling the latter.

In the simplest form of assembler or aliner, the keys may be omitted, in which case the element positioners will be adjusted by hand in the use of the assembler or aliner.

What is claimed as the invention is:—

1. Pattern-chain assembling mechanism for use in assembling a series of pattern-chain elements of different sizes and a supporting-bar therefor, comprising a series of element-positioners respectively adjustable into positions in which the openings of the said elements of different sizes are alined with one another so that the supporting-bar may be combined with the series by placing it in the said alined openings, and means for combining a supporting-bar with said alined series.

2. Pattern-chain assembling mechanism for use in assembling a series of pattern-chain elements of different sizes and a supporting-bar therefor, comprising a series of element-positioners, keys for use in setting said positioners in positions in which the openings of the elements of different sizes aline with one another so that the supporting-bar may be combined with the series by placing it in the said alined openings, and means for combining a supporting-bar with said alined series.

3. Pattern-chain assembling mechanism comprising means for selectively presenting chain-elements of different sizes to the element-alining devices, side by side, devices for alining a row of the said chain-elements in proper relations for application of a supporting-bar, and means for combining a supporting bar therewith.

4. Pattern-chain assembling mechanism comprising devices for selectively presenting chain-elements of different diameters to the alining devices, side by side, devices for alining a row of said chain-elements with their eyes registering with one another in readiness for the application of a supporting-bar thereto, and means for combining a supporting-bar therewith.

5. Pattern-chain assembling mechanism comprising, in combination, containers for indicator-elements, selective feeding means for said elements, means for axially alining a series of elements which has been fed, in readiness for application of a supporting-bar thereto, and means for combining a supporting-bar therewith.

6. Pattern-chain assembling mechanism comprising, in combination, containers for indicator-elements, devices for selecting elements from said containers and alining them axially in a series in readiness for the application of a supporting-bar thereto, and means for combining a supporting-bar therewith.

7. A pattern-chain assembling machine comprising a receiver made up of a row of independently movable sections, means for feeding pattern-chain-members of different diameters into position side by side within said receiver, and means for adjusting the sections to aline the eyes of the said chain-members so as to permit a rod to be passed lengthwise through the series of chain-members.

8. An assembling machine comprising a receiver, means for selectively assembling a row of apertured members of different diameters within said receiver, and means for adjusting some of the members of said row to the exclusion of the others to bring all of the apertures into alinement so that a rod or bar can be passed lengthwise through the apertures of all of said members.

9. An assembling machine comprising a receiver, and devices for selectively assembling a row of apertured members of different diameters side by side within said receiver and adjusting the members of said row to bring all of the apertures into alinement so that a rod or bar can be passed lengthwise through the apertures of all of the assembled members.

10. An assembling machine comprising a receiver, means, including a plurality of manually-operated keys, for selectively assembling a row of apertured members of different diameters within said receiver and automatically adjusting the members of said row to bring all of the apertures into alinement, and means for passing a rod or bar lengthwise into the apertures of all of the assembled members.

11. An assembling machine comprising a receiver, means for selectively assembling a row of apertured members of different diameters within said receiver, said means including a plurality of manually-operated keys, means through which said keys automatically adjust the members of said row to bring all of the apertures into alinement so that a rod or bar can be passed lengthwise through the assembled members, and means for restoring said assembling means, including said keys, to normal condition.

12. An assembling machine comprising a receiver having a series of movable sections; and means for selectively feeding apertured members of different diameters into position side by side within said receiver, said means including a plurality of manually-operated keys controlling the positions of said sections so as to aline the apertures of all of the members delivered into the receiver to permit a rod or bar to be passed lengthwise through the apertures of the assembled members.

13. An assembling machine comprising a receiver having a series of movable sections; means for selectively feeding apertured members of different diameters into position side by side within said receiver, said means including a plurality of manually-operated keys, said keys acting to adjust the movable sections so as to aline the apertures of the members delivered into the receiver, and means for restoring the keys and sections to their normal positions.

14. An assembling machine comprising a trough having a series of movable sections, means for holding supplies of apertured members of different diameters, a plurality of runways arranged to deliver apertured members into said trough in a row side by side, feeders for delivering the apertured members individually from said supply holding means to the said runways, keys for selectively operating said feeders, and means for adjusting said movable sections and the members assembled within said trough to aline the apertures of said members.

15. An assembling machine comprising a trough having a series of movable sections, means for holding supplies of apertured members of different diameters, a plurality of runways arranged to deliver apertured members into said trough in a row side by side, feeders for delivering the apertured members individually from said supply-holding means to the said runways, keys for selectively operating said feeders, means for adjusting said movable sections and the members assembled within said trough to aline the apertures of said members, and means for inserting a rod or bar in the apertures of the series.

16. In an assembling machine, the combination with a receiver having a series of movable sections, means for holding supplies of apertured members of different diameters, a plurality of runways arranged to deliver into said receiver, and feeders for delivering the members individually from said supply-holding means to said runways, of a plurality of manually-operated keys; connections through which said keys operate said feeders, and means through which said keys control the positions of said movable sections to aline the apertures of all of the members assembled within said receiver.

17. In an assembling machine, the combination with a receiver having a series of movable sections, means for holding supplies of apertured members of different diameters, a plurality of runways arranged to deliver into said receiver, and feeders for delivering the members individually from said supply-holding means to said runways, of a plurality of manually-operated keys, connections through which said keys operate said feeders, means through which said keys control the positions of said movable sections to aline the apertures of all of the members assembled within said receiver, and means for inserting a rod or bar in the apertures of the series.

18. An assembling machine comprising a trough having a series of movable sections, means for holding supplies of apertured members of different diameters, a plurality of runways arranged to deliver into said trough, and feeders for delivering the members individually from said supply-holding means to said runways, of a plurality of manually-operated keys, connections through which said keys operate said feeders, means through which said keys control the positions of said movable sections to aline the apertures of all of the members assembled within said trough, and means for restoring the keys and connected devices to normal condition.

19. In an assembling machine, the combination with a receiver having a series of movable sections, and means for holding supplies of apertured members of different diameters, of a plurality of runways arranged to deliver into said trough, a plurality of independently operable feeders for delivering the members individually from said supply-holding means to the said runways, and means for alining the apertures of all of the members assembled within said receiver.

20. In an assembling machine, the combination with a receiver having a series of movable sections, means for holding a supply of relatively large apertured members, and means for holding a supply of relatively small apertured members, of a plurality of runways leading from said supply-holding means to said receiver, and a plurality of movably supported feeders for transferring said members from said supply-holding means to said runways, each of said feeders being operable to transfer either a large or a small member.

21. In an assembling machine, the combination with a receiver having a series of movable sections, means for holding a supply of relatively large apertured members, and means for holding a supply of relatively small apertured members, of a plurality of movably supported feeders for said members, each adapted to be moved in one direction to transfer a small member and in the opposite direction to transfer a large member, and each of said feeders being operable to transfer either a large or small member.

22. An assembling mechanism for use in assembling a series of elements of different sizes and a supporting-bar therefor, comprising a series of element-positioners respectively adjustable into positions in which the openings of the said elements of different sizes are alined with one another so that the supporting bar may be combined with the series by placing it in the said alined openings.

23. An assembling mechanism for use in assembling a series of elements of different sizes and a supporting-bar therefor, comprising a series of element-positioners, and keys for use in setting said positioners in positions in which the openings of the elements of different sizes aline with one another so that the supporting-bar may be combined with the series by placing it in the said alined openings.

24. An assembling mechanism for use in assembling a series of elements of different sizes and a supporting-bar therefor, comprising a series of element-receivers respectively adjustable to aline the openings of the said elements of different sizes with one another, and means for inserting the said supporting-bar into the alined openings.

25. An assembling mechanism for use in assembling a series of elements of different sizes and a supporting-bar therefor, comprising a series of element-receivers, and keys for use in setting said receivers so that the openings of the elements of different sizes supported thereby shall aline with one another, and means for inserting the supporting-bar into the alined openings.

26. Pattern-chain assembling mechanism comprising means for selectively presenting chain-elements of different sizes to the element-alining devices, side by side, and devices for alining a row of the said chain-elements in proper relations for combination with a supporting-bar.

27. Pattern-chain assembling mechanism comprising devices for selectively presenting chain-elements of different diameters to the alining devices, side by side, and devices for alining a row of said chain-elements with their eyes registering with one another in readiness for the combination of a supporting-bar therewith.

28. Pattern-chain assembling mechanism comprising, in combination, containers for indicator-elements, selective feeding means for said elements, and means for axially alining a series of elements which has been fed, in readiness for combination of a supporting-bar therewith.

29. Pattern-chain assembling mechanism comprising, in combination, containers for indicator-elements, and devices for selecting elements from said containers and alining them axially in a series in readiness for combination with a supporting-bar.

30. An assembling mechanism for use in assembling a series of elements of different diameters and a supporting-bar therefor, comprising a series of element-receivers side by side, and keys having cams for adjusting said element-receivers so that the openings of the elements of different diameters supported by the respective receivers shall aline with one another in readiness for the insertion of the supporting-bar.

31. An assembling mechanism for use in assembling a series of elements of different diameters and a supporting-bar therefor, comprising a series of element-receivers side by side, keys having cams for adjusting said element-receivers so that the openings of the elements of different diameters supported by the respective receivers shall aline with one another in readiness for the insertion of the supporting-bar, and feeders for the said elements operatively combined with said keys.

32. Pattern-chain assembling mechanism comprising means for holding a set of pattern-chain elements of different kinds, side by side, and means for relatively positioning the elements of a set assembled in said holder to adapt them to receive their carrier-rod.

33. A pattern or control-chain assembler for use with chain-elements or indicators having eyes or openings comprising positioning devices for a row or series of chain-elements or indicators adjustable to position elements or indicators of different sizes with their openings alined for reception of a supporting-bar.

34. Pattern or control-chain assembling mechanism comprising means for supporting a row or series of chain-elements or indicators of different sizes with their openings alined and means for inserting a supporting-bar into the alined openings.

In testimony whereof I affix my signature in presence of two witnesses.

FRANK R. BATCHELDER.

Witnesses:
ALICE M. TISDALE,
A. LORETTA MATTIMORE.

Copies of this patent may be obtained for five cents each, by addressing the "Commissioner of Patents, Washington, D. C."